United States Patent
Schenone et al.

(10) Patent No.: US 11,119,621 B2
(45) Date of Patent: Sep. 14, 2021

(54) COMPUTING DEVICE DISPLAY MANAGEMENT

(71) Applicant: Microsoft Technology Licensing, LLC, Redmond, WA (US)

(72) Inventors: Scott D. Schenone, Seattle, WA (US); Timothy G. Escolin, Seattle, WA (US); Michael F. Deily, Bellevue, WA (US); David P. Platt, North Bend, WA (US); Eli Barel, Rosh HaAyin (IL); Megan L. Tedesco, Sammamish, WA (US); Young S. Kim, Bellevue, WA (US); Panos C. Panay, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/128,390

(22) Filed: Sep. 11, 2018

(65) Prior Publication Data
US 2020/0081584 A1 Mar. 12, 2020

(51) Int. Cl.
*G06F 3/0481* (2013.01)
*G06F 1/16* (2006.01)
*G06F 3/02* (2006.01)
*G06F 3/0354* (2013.01)

(52) U.S. Cl.
CPC .......... *G06F 3/0481* (2013.01); *G06F 1/1616* (2013.01); *G06F 1/1647* (2013.01); *G06F 1/1662* (2013.01); *G06F 3/0227* (2013.01); *G06F 3/03547* (2013.01); *G06F 2203/04803* (2013.01)

(58) Field of Classification Search
CPC .. G06F 3/0481; G06F 3/04803; G06F 3/0227; G06F 1/1616; G06F 1/1647; G06F 1/1662
See application file for complete search history.

(56) References Cited

U.S. PATENT DOCUMENTS

| | | | |
|---|---|---|---|
| 9,508,320 B2 * | 11/2016 | Ording | G06T 13/80 |
| 10,254,803 B1 * | 4/2019 | Quinn | G06F 1/1643 |
| 2008/0158189 A1 * | 7/2008 | Kim | G06F 3/04886 345/173 |
| 2010/0039764 A1 | 2/2010 | Locker et al. | |
| 2010/0207888 A1 * | 8/2010 | Camiel | G06F 1/1616 345/168 |
| 2014/0085342 A1 | 3/2014 | Shoemaker | |
| 2015/0015495 A1 * | 1/2015 | Narayanaswami | G06F 3/04186 345/173 |
| 2015/0134572 A1 | 5/2015 | Forlines et al. | |
| 2016/0034243 A1 | 2/2016 | Agarwal | |
| 2018/0048888 A1 * | 2/2018 | Zhao | H04N 19/103 |
| 2018/0329580 A1 * | 11/2018 | Aurongzeb | G06F 1/1652 |
| 2020/0042170 A1 * | 2/2020 | Goulden | G06F 3/04842 |

OTHER PUBLICATIONS

"International Search Report and Written Opinion Issued in PCT Application No. PCT/US2019/038859", dated Sep. 26, 2019, 14 Pages.

* cited by examiner

*Primary Examiner* — Sherrod L Keaton
(74) *Attorney, Agent, or Firm* — Rainier Patents, P.S.

(57) ABSTRACT

The description relates to computing devices that have one or more displays. One example can manage the display as a unit and identify a change in a condition associated with the display. The example can alter at least one of a location, aspect ratio, or size of the unit based on the condition.

20 Claims, 19 Drawing Sheets

COMPUTING DEVICE DISPLAY MANAGEMENT

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DESCRIPTION

Figure 1A:
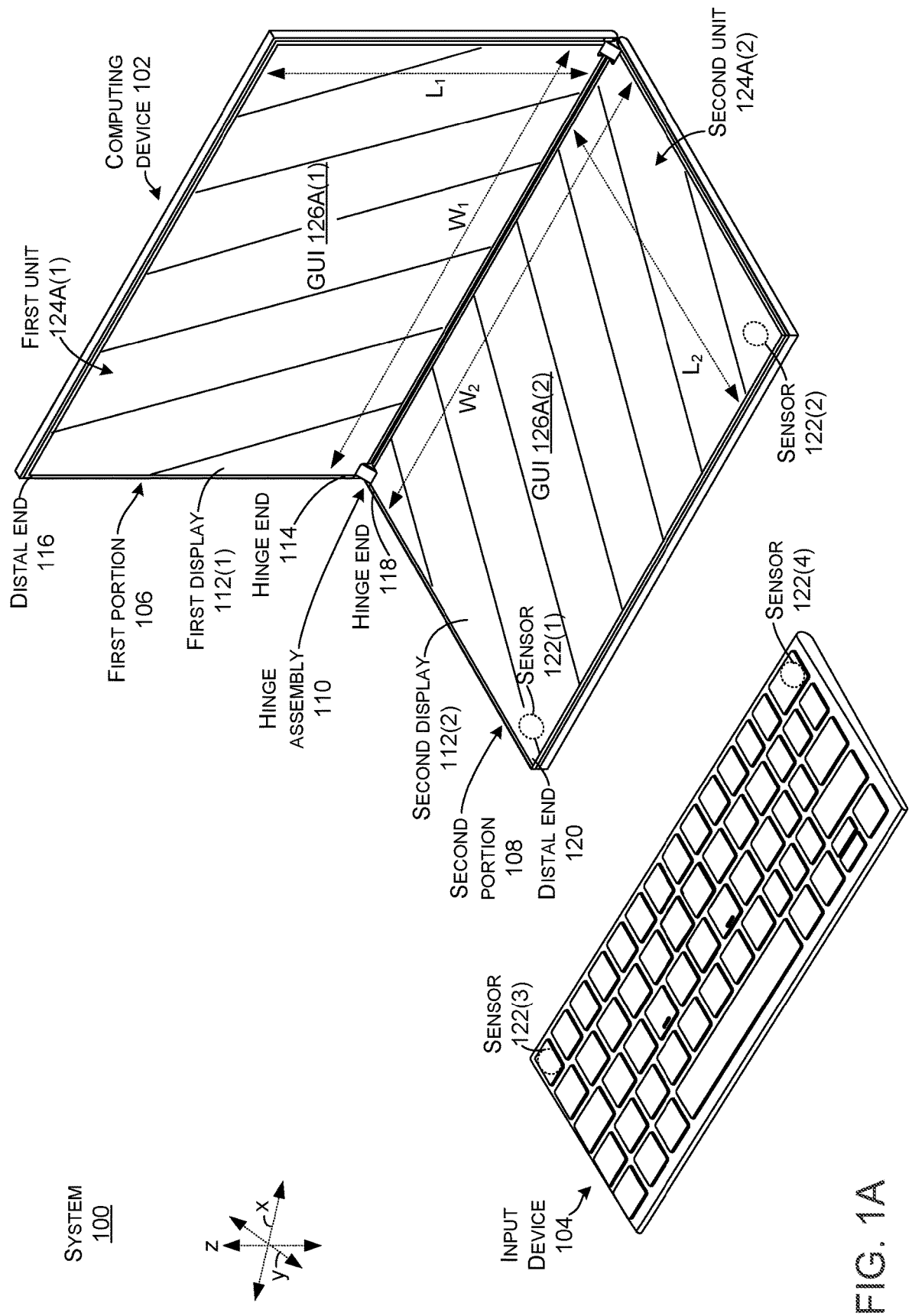
FIGS. 1A-3D show perspective views of example computing devices and associated input devices in accordance with some implementations of the present display management concepts.

The present concepts relate to devices, such as computing devices and associated input devices. The computing device can include one or more displays. The displays can be managed as one or more units. The units of the displays can be managed for a specific functionality. For instance, one unit can be used to present content as a graphical user interfaces (GUIs) while another unit is used to present other content as another GUI and still another unit can be used as an input device (e.g., the unit may function as a trackpad). The overall portion of the display dedicated to each unit and/or the location of the unit can be varied depending upon various conditions. For instance, in some cases, some units may be blocked from view. For example, a user may place the input device on the display. Units affected by the blockage can be reconfigured (e.g., their size and/or location on the display can be changed) to accommodate the blockage. The unit underlying the input device may be managed in a manner that reflects that it is not visible to the user.

Sometimes users can be disoriented or confused by sudden reconfiguration of the units. As such, the present concepts can provide visual indications to the user that indicate how the units are going to be reconfigured (e.g., before the input device is physically positioned on the display). The visual indications may be accomplished with one or more transition GUIs that reflect unit size and/or location on the display so that the user can understand what is happening. Further, the presence of the input device may make some units unsuitable for their present use. In such cases, the present concepts can assign an alternative functionality to those units. These aspects and others are described in more detail below.

Introductory FIGS. 1A-1F shows a system 100 that can include an example computing device 102 and an associated input device 104 that can communicate with computing device 102. In this example, the associated input device 104 is a wireless detachable input device that can communicate with computing device 102 via one or more wireless technologies, such as Bluetooth, and/or near field communication (NFC), among others. In this case, the computing device 102 has first and second portions 106 and 108 that are rotatably secured together by a hinge assembly 110. Other example computing devices could be manifest as a single portion (e.g., a tablet) or more than two portions. Example input devices 104 can include a keyboard, a touch pad, and/or a game controller, among others.

Displays 112 can be positioned on the first and/or second portions 106 and 108. Displays often are touch sensitive displays that can detect pressure and/or proximity of nearby objects. Display 112(1) can extend from a hinge end 114 to a distal end 116 to define a length $L_1$ and can also define a width $W_1$ that lies orthogonal to the length $L_1$. Display 112(2) can extend from a hinge end 118 to a distal end 120 to define a length $L_2$ and can also define a width $W_2$ that lies orthogonal to the length $L_2$. The length and the width can define the display area (e.g., rectangle) of the display. Input device 104 can have a width $W_3$ that lies orthogonal to the length $L_3$. In the illustrated case, the width of the input device is approximately the same as the width of the displays. In other cases, the input device could be narrower or wider than the displays.

System 100 can also include sensors 122 that can convey information about the position and/or movement of input device 104 relative to computing device 102. In this example, sensors 122(1) and 122(2) are positioned on computing device 102 and sensors 122(3) and 122(4) are positioned on input device 104. In one implementation, the sensors can be manifest as near field communication (NFC) sensors. NFC sensors can utilize electromagnetic induction between two loop antennas to communicate data between two devices. However, the present concepts can leverage changes to the electromagnetic fields to convey information about the position and/or movement of the input device 104 relative to the computing device 102. This technique can be effective out to around 10-30 centimeters, for example. Alternatively, Bluetooth sensors (e.g., Bluetooth Low Energy (BLE)) beacons can be employed to track the location and/or movement of the input device relative to the computing device. Further, as mentioned above, the displays can have pressure and/or proximity sensors that can contribute position and/or movement information.

In this configuration, units 124 of displays 112 (e.g., of the display area) can be managed for specific functions. In FIG. 1A, unit 124(1) includes all of display 112(1) and unit 124(2) includes all of display 112(2). This relationship between the units and the displays can be fluid as will become apparent through the description below (e.g., the size, location, and/or number of units can change).

For purposes of explanation, assume that unit 124(1) is being utilized to present a first graphical user interface (GUI) 126(1) and unit 124(2) is being utilized to present a second GUI 126(2). For instance, the first GUI might be associated with a first application and the second GUI might be associated with a second application.

FIGS. 1A-1F capture specific instances of a process that may extend for a time duration. From one perspective, the instances captured in the series of FIGS. 1A-1F may be viewed as snapshots from a video progression from a time starting at FIG. 1A (e.g., original configuration and culminating at FIG. 1F (e.g., updated configuration)). Starting with FIG. 1A, the input device 104 is physically separated from the computing device 102. The user can utilize the input device to control the computing device, such as the GUIs 126. For instance, GUI 126A(1) could be associated with a first application and GUI 126A(2) could be associated with a second application. Now assume that the user decides to move the input device 104 and place it on the computing device's second portion 108.

Figure 1B:
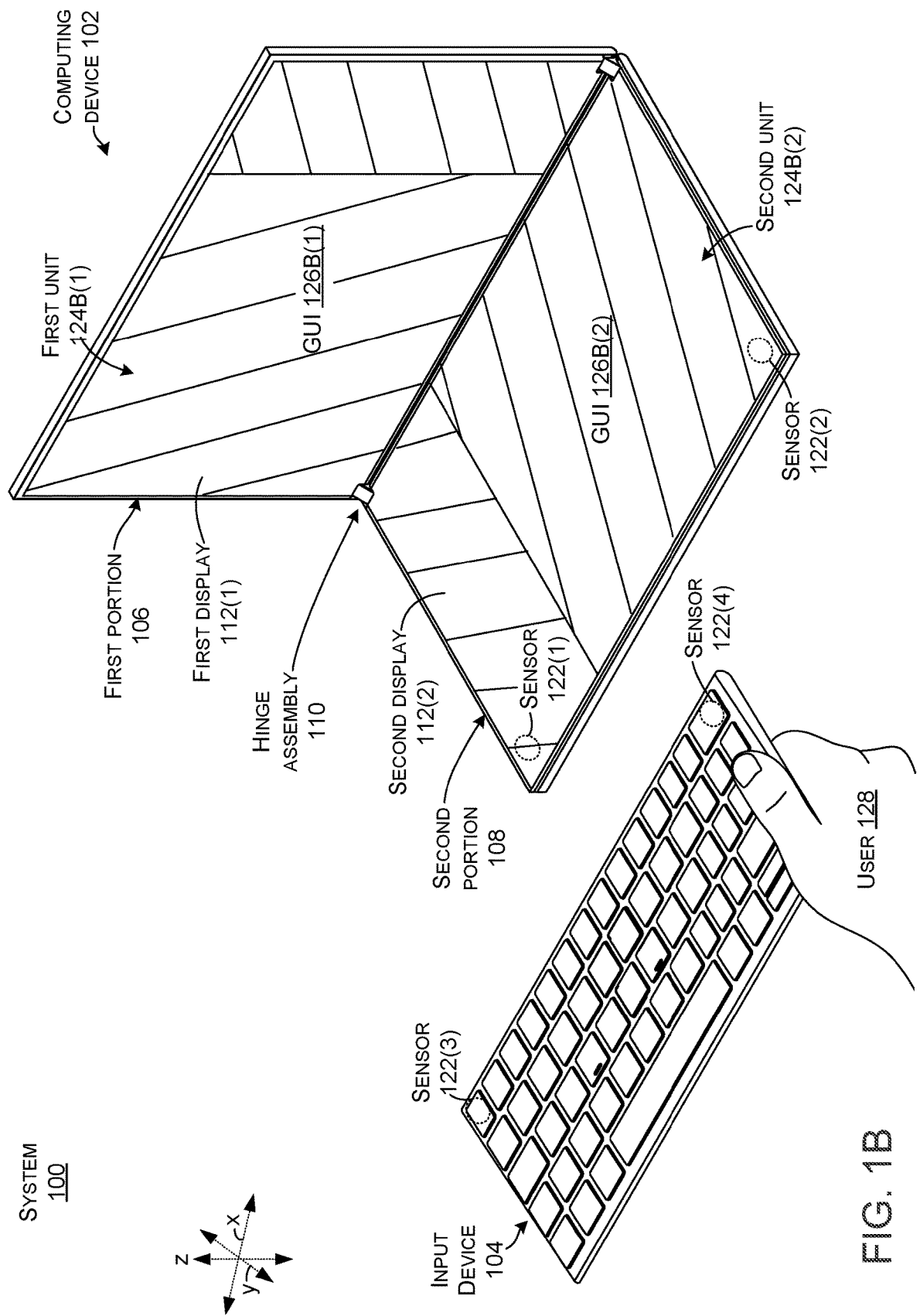

FIG. 1B shows user 128 moving the input device 104 toward the computing device 102 (in this case toward the second portion 108). This movement, such as location and direction of movement, has been detected by the sensors 122. Computing device 102 can predict that the movement will result in the input device 104 positioned on and occluding a portion of the second display 112(2). As such, units on this display can be moved, such as to first display 112(1). However, instantaneous reconfiguration of the units may disorient the user. Thus, GUIs 126B(1) and 126B(2) can be termed transition GUIs, which show an intervening configuration of the units 124B from the initial configuration (FIG. 1A) to the updated configuration of reconfigured units 124E of FIG. 1F.

Figure 1C:
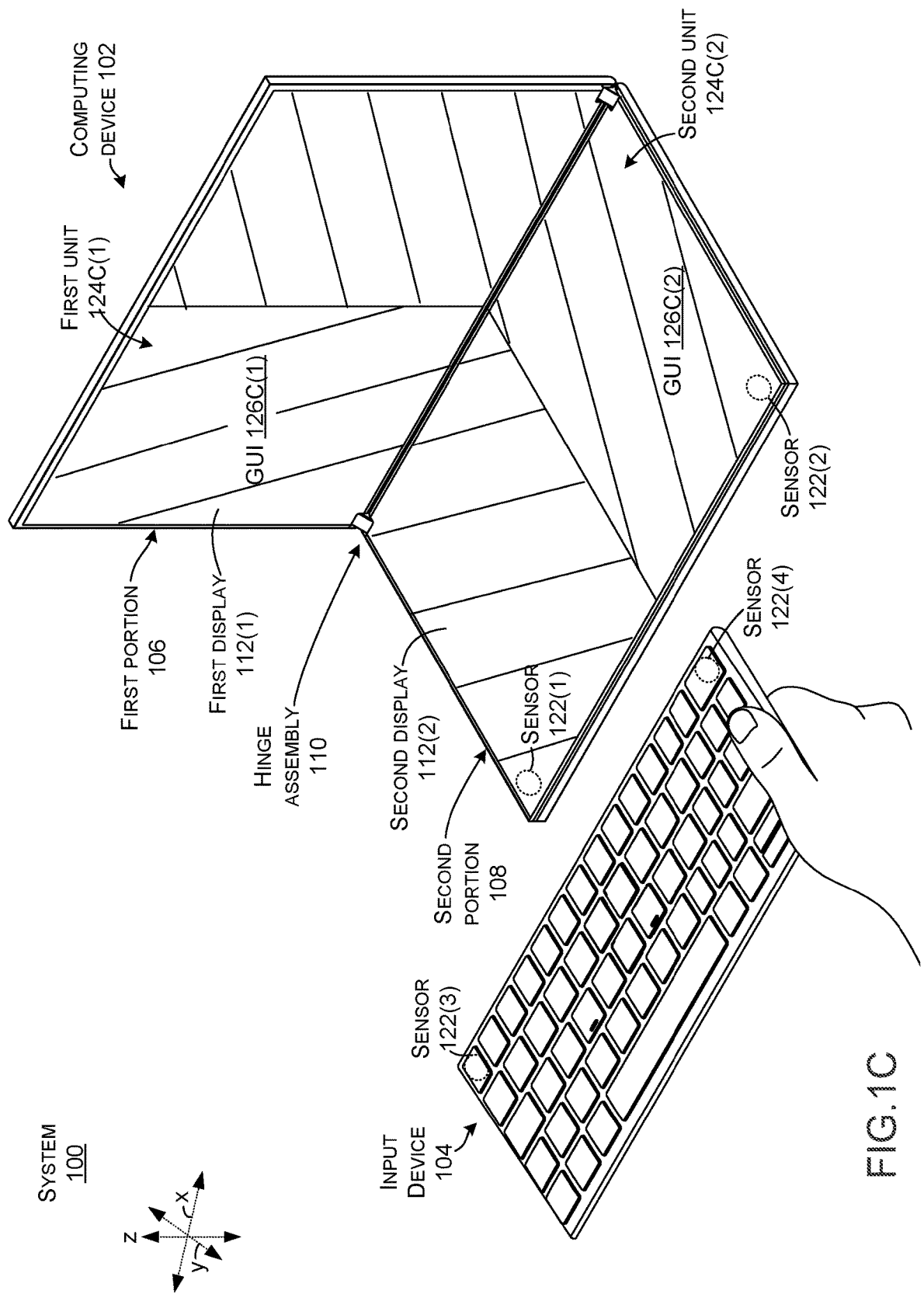
Figure 1D:
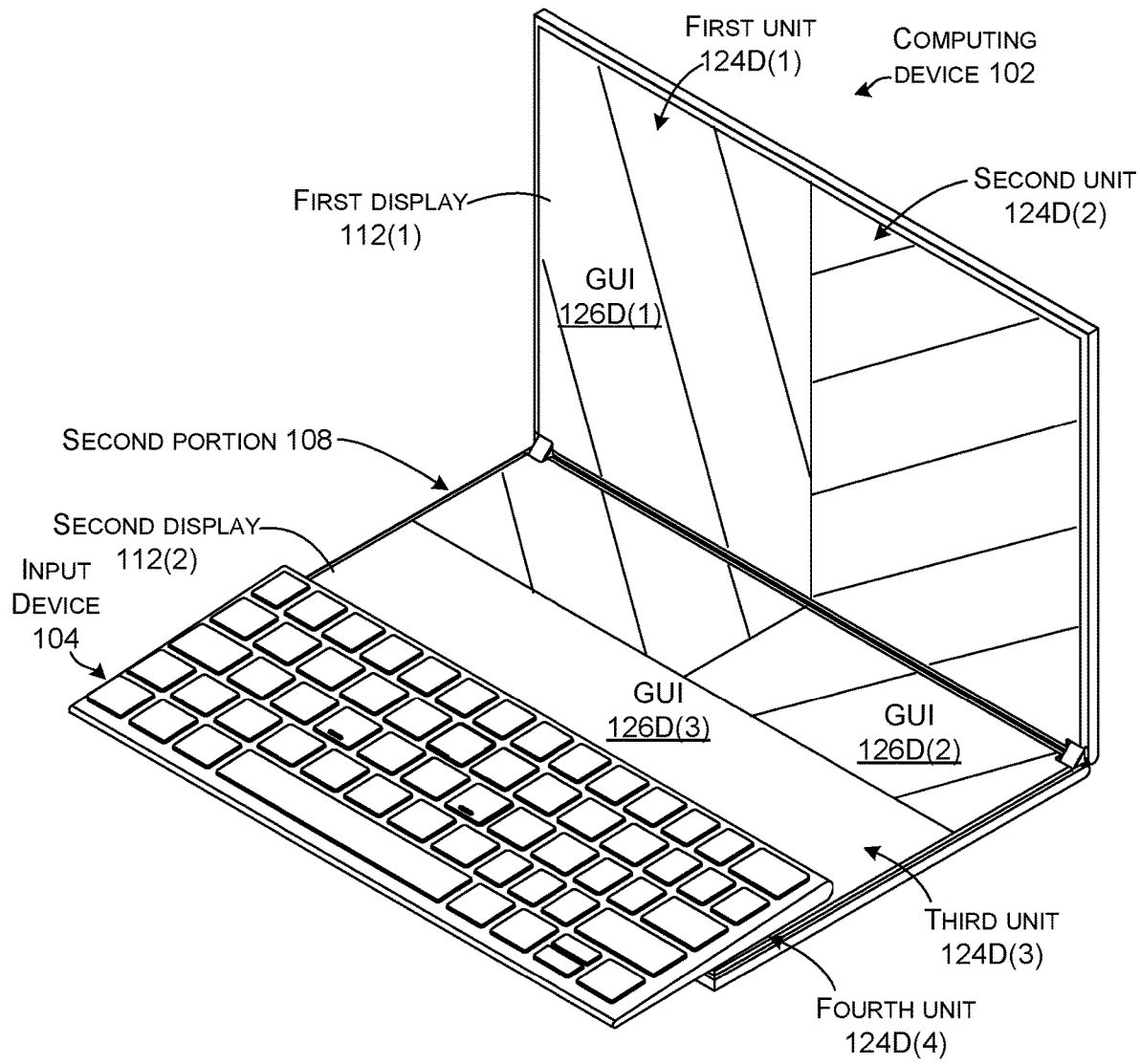

FIG. 1B shows the initial transition GUIs 126B(1) and 1266(2). Transition GUI 126B(1) is moving to the left and GUI 126B(2) is moving to the right. At this point, each transition GUI 126B occupies a portion of the first display 112(1) and the second display 112(2). Here, transition GUI 126B(1) occupies a majority of first display 112(1) but has moved to the left to create a space for transition GUI 1266(2). Similarly, transition GUI 126B(2) has moved to the right on second display 112(2) where it still occupies a majority of the space and it also occupies the rightmost portion of first display 112(1). In this case, subsequent transition GUIs are shown in FIGS. 1C-1D. The transition GUIs can provide a visual indication to the user that explains how the units are being reconfigured due to the predicted changing conditions (e.g., changing position of the input device).

To summarize in this example scenario starting at FIG. 1A, unit 124(1) occupies all of the first display 112(1) and unit 124(2) occupies all of second display 112(2) (e.g., the units are vertically arranged one atop the other). Eventually, in FIG. 1E the first unit 124(1) and the second unit 124(2) are both on first display 112(1) in a side-by-side (e.g., horizontal relationship). FIGS. 1B-1D show the visual indictors that are presented to help the reader understand what is happening.

FIG. 1C shows a subsequent view where the user is continuing to move the input device 104 toward the computing device 102. At this point transition GUIs 126C are positioned side-by-side on both displays 112. The transition GUIs 126C are positioned on the first display 112(1) and extend down onto second display 112(2).

FIG. 1D shows a subsequent point where the input device 104 is partly over the second display 112(2). The presence of the input device (e.g., sensed position) can be sensed by sensors 122 and/or by sensors of display 112(2) (e.g., in the case where the display is a touch sensitive display). Transition GUIs 126D(1) and 126D(2) have moved away from the input device 104 and an additional transition GUI 126D(3) indicates a third unit 124D(3) and additional transition GUI indicates a fourth unit 124D(4) on the second display 112(2). The third unit 124D(3) can be used for various functions, such as a touch sensitive tool bar, or a touch pad, among others. The fourth unit 124D(4) can be an area blocked by the input device and thus not used to present content or for receiving touch gestures (e.g., no corresponding GUI). In some implementations, the blocked fourth unit 124D(4) can be powered down (e.g., operated in a lower power state) to reduce resource usage (e.g., battery usage).

For instance, the occluded fourth unit 124D(4) of the display could be powered down by turning off pixels in the case where the display is an OLED display, or turning off certain LEDs for an LCD display, among others.

Figure 1E:
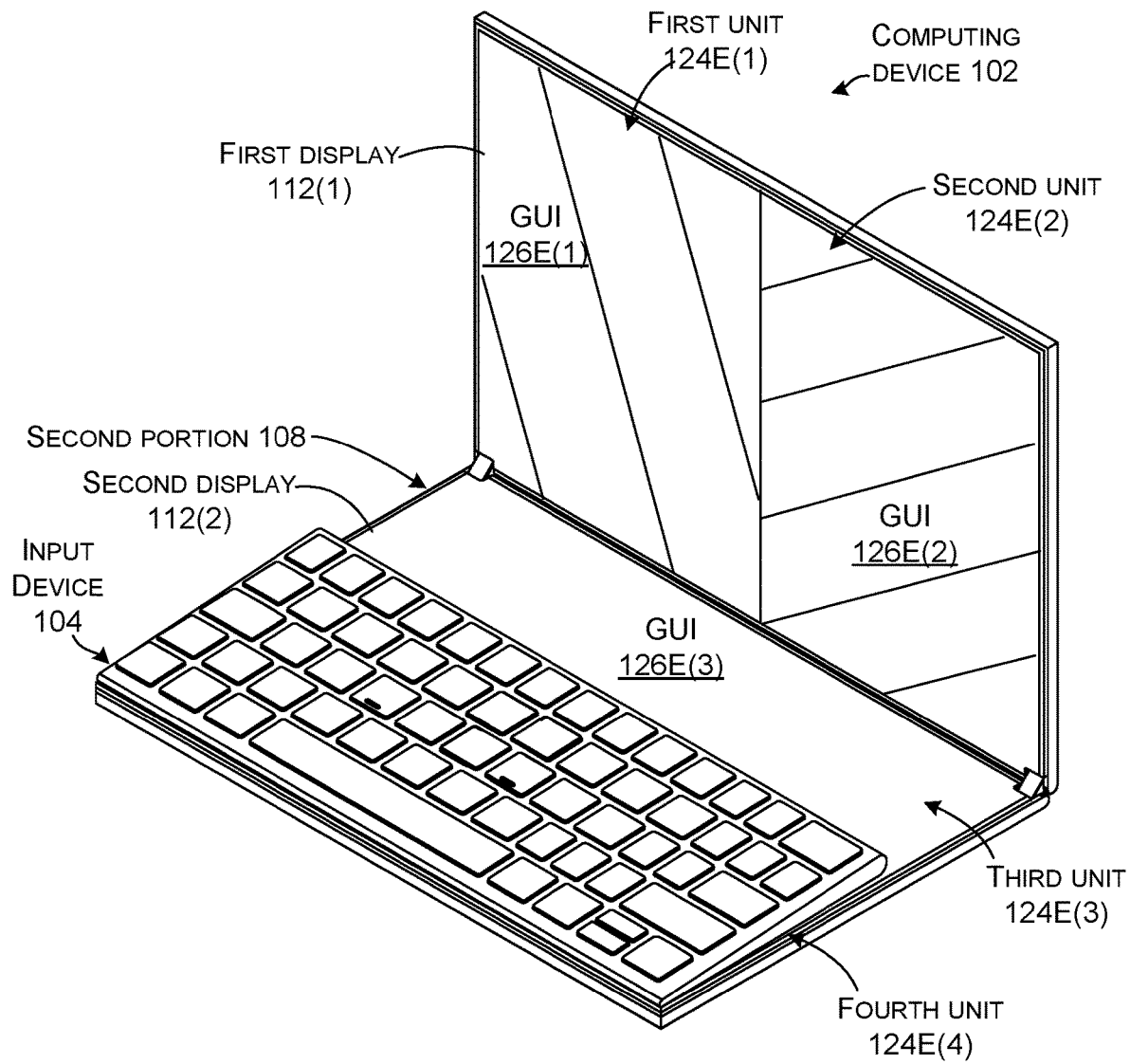

FIG. 1E shows a subsequent point where the input device 104 is positioned on the second display 112(2). Thus, fourth unit 124E(4) is blocked by the input device. Transition GUIs 126E(1) and 126E(2) are now side-by-side on the first display 112(1). Transition GUI 126E(3) shows that unit 124E(3) of second display 112(2) will be managed for a new functionality. The new functionality can be determined based upon the dimensions of the unit and/or be defined by the user. For instance, the dimensions of unit 124E(4) may not lend themselves to presenting content and may be better suited to other functionalities, such as a touch sensitive tool bar. The touch sensitive tool bar can be generic (e.g., tied to an operating system of the computing device). Alternatively, the touch sensitive tool bar could relate to a specific application. For instance, GUI 126E(1) could be dedicated to presenting content of an application, such as a word processing application, for example. GUI 126E(3) could present the controls for the application on the touch sensitive tool bar. Thus, more display area of first unit 124E(1) could be dedicated to presenting content at an aspect ratio that lends itself to content presentation and display area of the third unit 124E(3) can be used for the control aspects of the application in an aspect ratio that lends itself to tool bars.

Figure 1F:
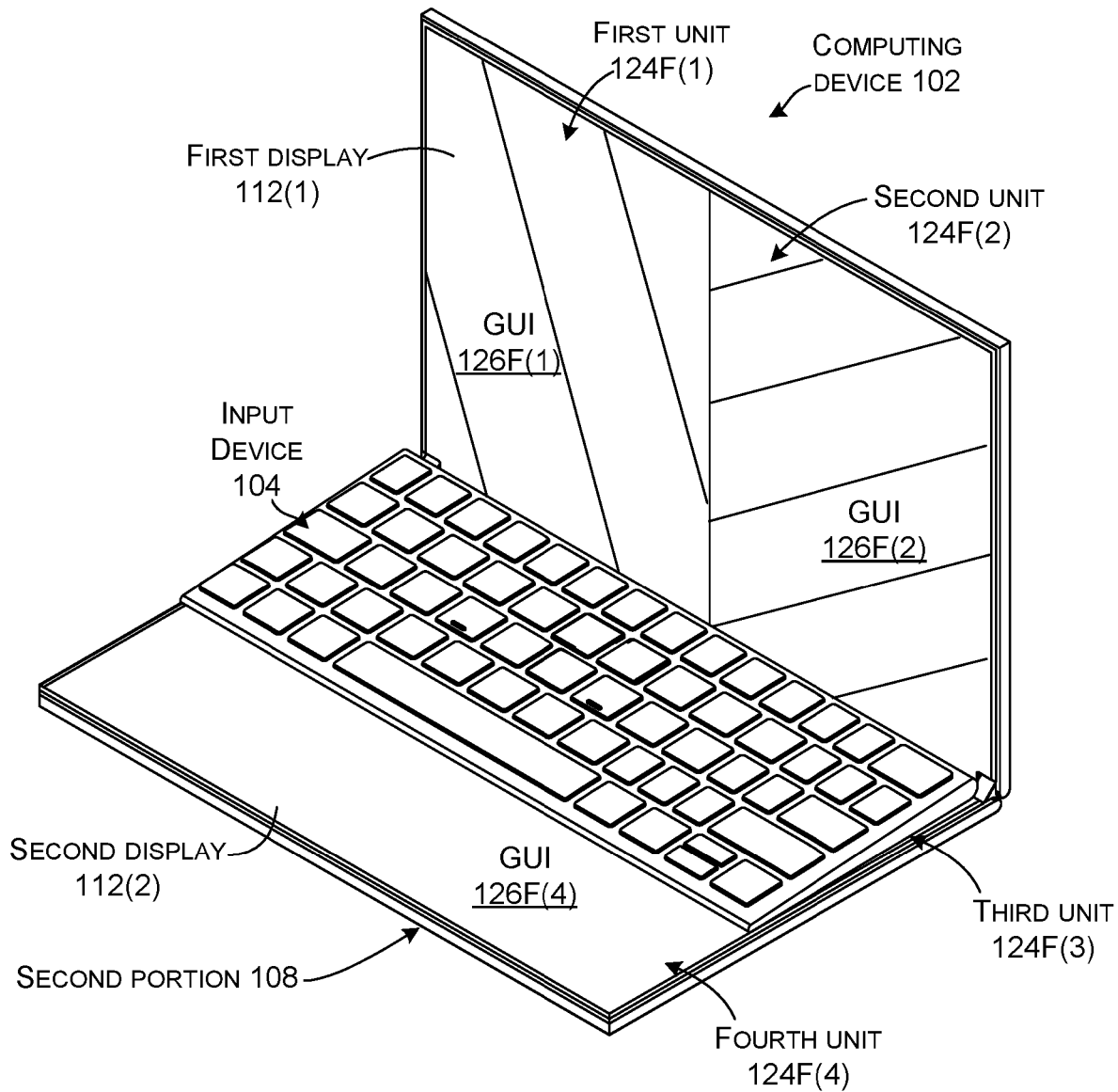

FIG. 1F shows a subsequent point where the user slid the input device 104 up the second display 112(2) against the first display 112(1). Unit 124F(3) is now blocked by the input device and unit 124F(4) of the second display is now available to perform a functionality. Thus, unit 124F(4) can now include a GUI 126F(4) while unit 124F(3) does not. In this case, the functionality may be touch pad functionality to complement the input device, for instance. FIGS. 1E and 1F show that any positioning of the input device 104 can be accommodated utilizing multiple units. For instance, if the input device was positioned at an intervening position, additional units could be managed above and below the input device.

FIGS. 2A-2G shows another system 200 that can include an example computing device 202 and an associated input device 204 that can communicate with computing device 202. In this case, the input device 204 can be rotatably secured to the computing device by an input hinge 205. One or more sensors 222 can provide sensor data relating to the orientation of the input device 204 to the computing device. In one implementation, the sensors can be positioned in the hinge itself. In another implementation, the sensors 222 can be positioned in the input device 204 and the computing device 202, such as proximate to the input hinge 205.

Figure 2A:
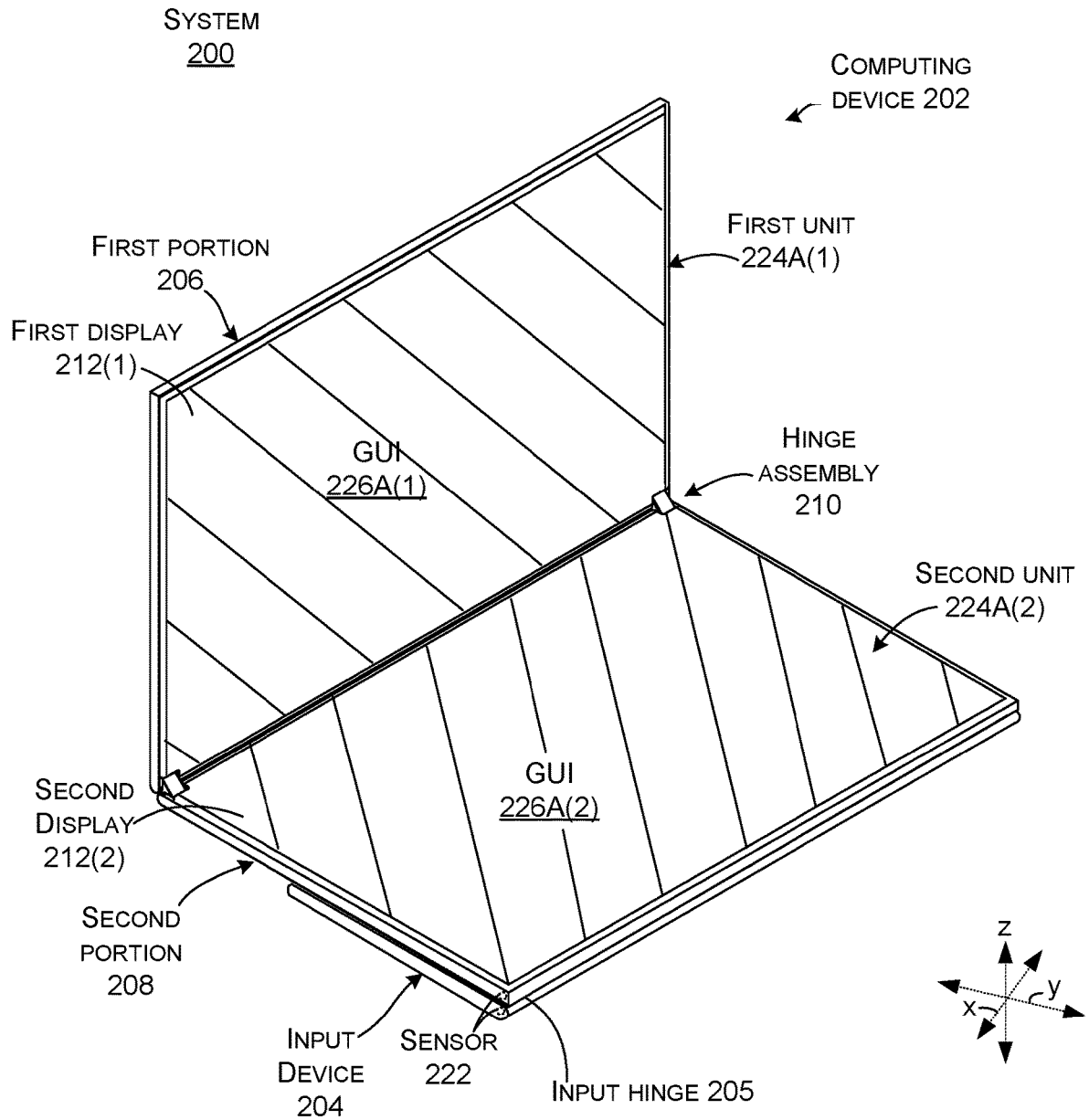

Starting at FIG. 2A, the input device 204 is positioned against the second portion 208 on the opposite side from the second display 212(2) (e.g., input device is in a storage position). The first display 212(1) is being managed as a single unit 224A(1). First GUI 226A(1) can be presented on first unit 224A(1). The second display 212(2) is being managed as a single unit 224A(2). Second GUI 226A(2) can be presented on second unit 224A(2).

Figure 2B:
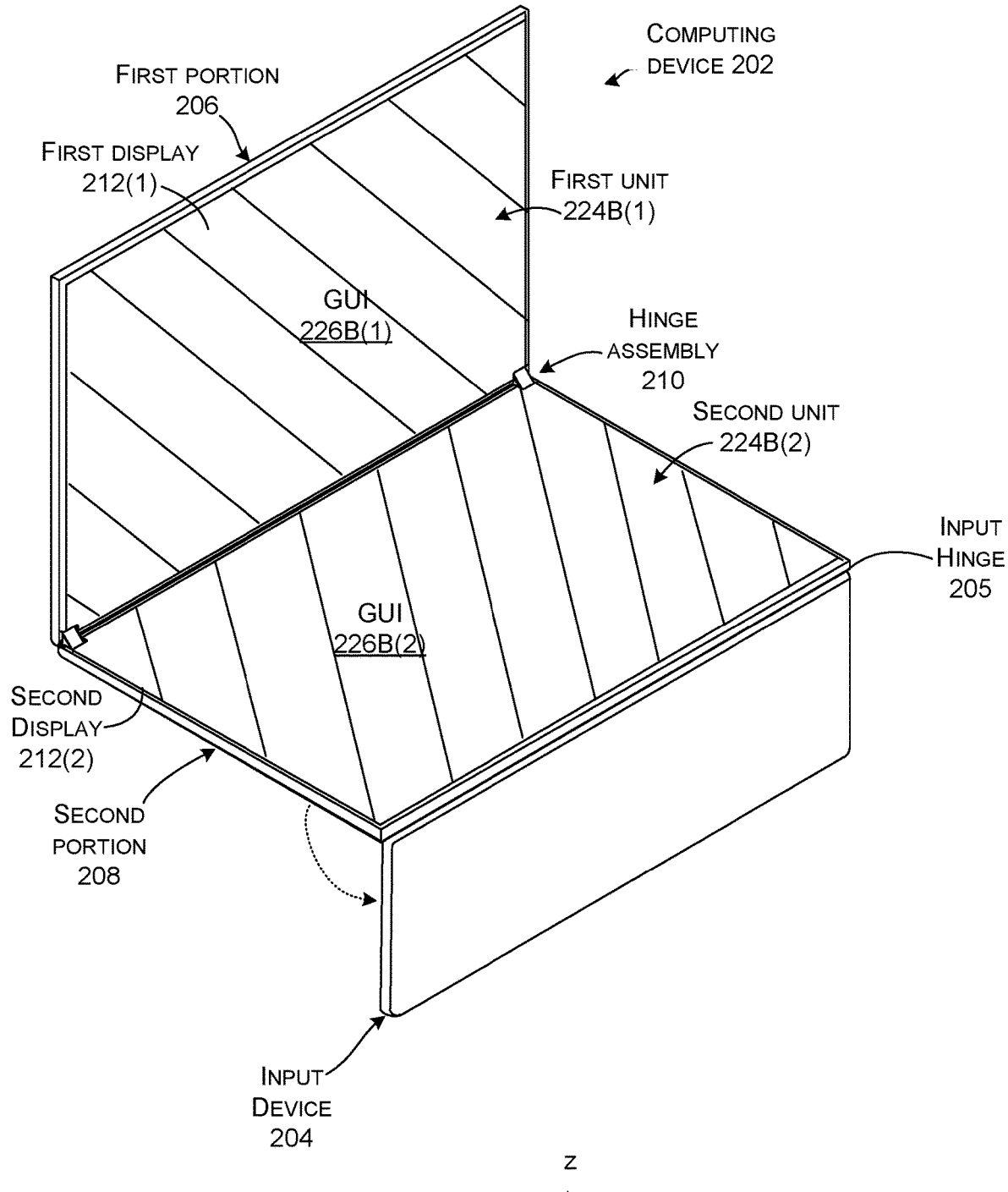

FIG. 2B shows the input device 204 rotated 90 degrees from the orientation of FIG. 2A. At this point, the first and second units 224B(1) and 224B(2) remain unchanged from FIG. 2A.

Figure 2C:
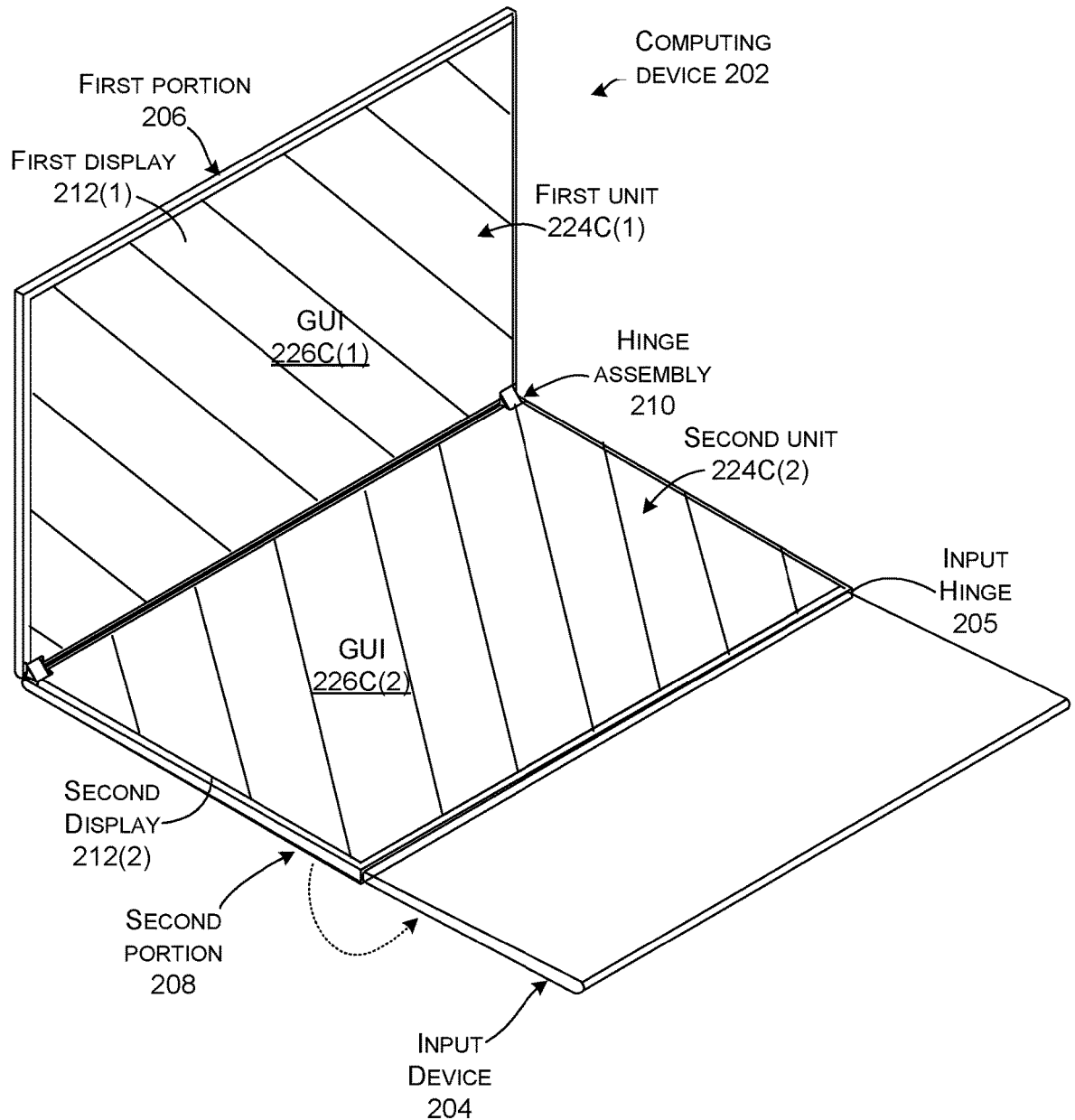
Figure 2C:
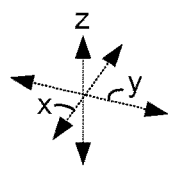

FIG. 2C shows an additional 90 degrees of rotation of the input device 204 from the orientation of FIG. 2B. This may be a working orientation, where the user positions the second portion 206 and the input device 204 on a work surface and uses the input device to control the computing device 202. The first and second units 224C(1) and 224C(2) remain unchanged from FIG. 2B.

Figure 2D:
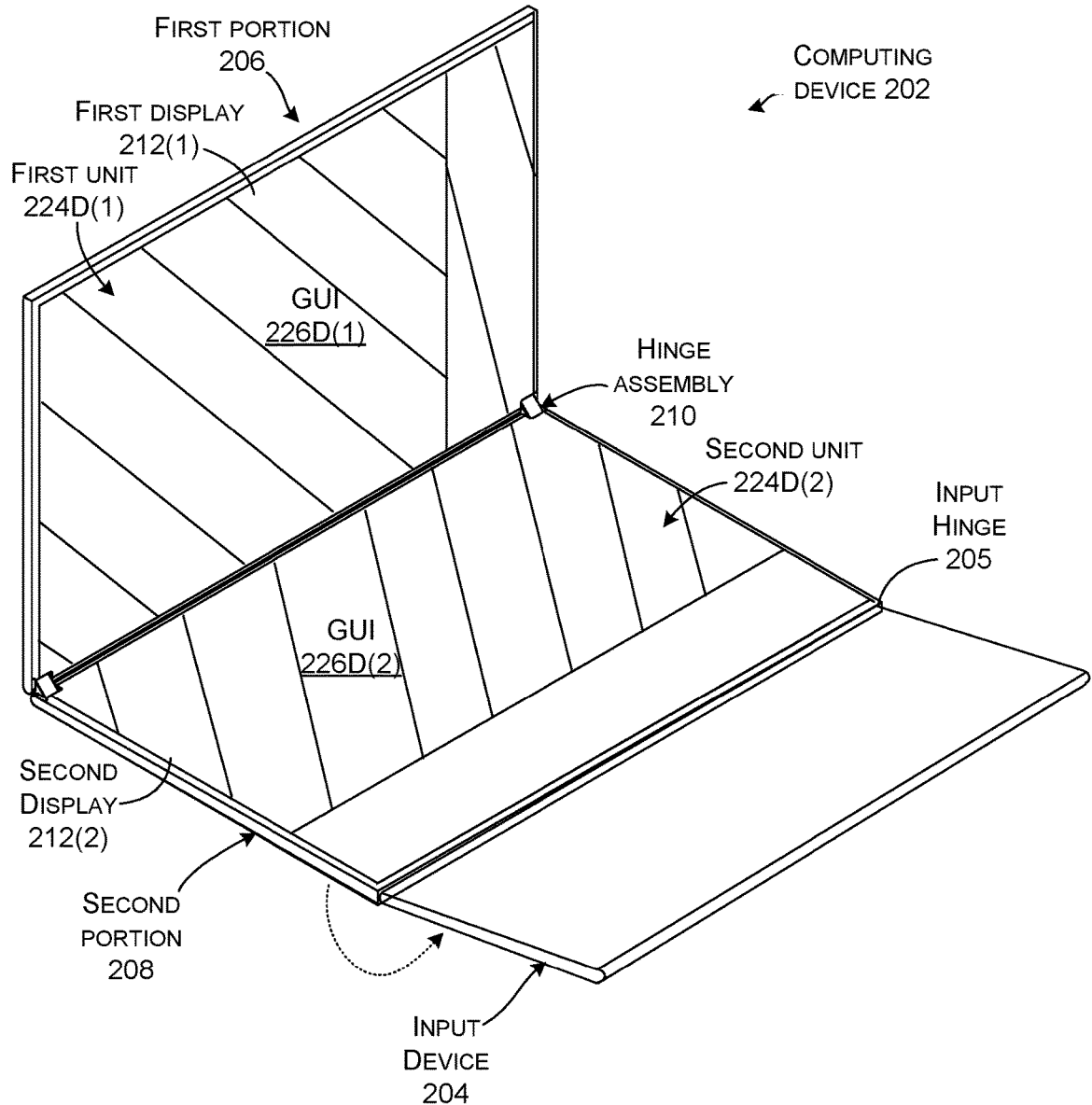
Figure 2D:
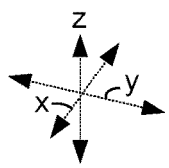

FIG. 2D shows an additional 10 degrees of rotation of the input device 204 from the orientation of FIG. 2C (190 degrees of rotation relative to FIG. 2A). At this point, computing device 202 can predict that the user will continue to rotate the input device and that the input device will visually and/or physically block some of second display 212(2). As such, units 224D(1) and 224D(2) can be changed as shown by GUIs 226D(1) and 226D(2). In this example, unit 224D(1) is narrowed from right to left and unit 224D(2) is extended up onto the vacated area of first display 212(1). This is visually represented by transition GUIs 226D(1) and 226D(2).

Figure 2E:
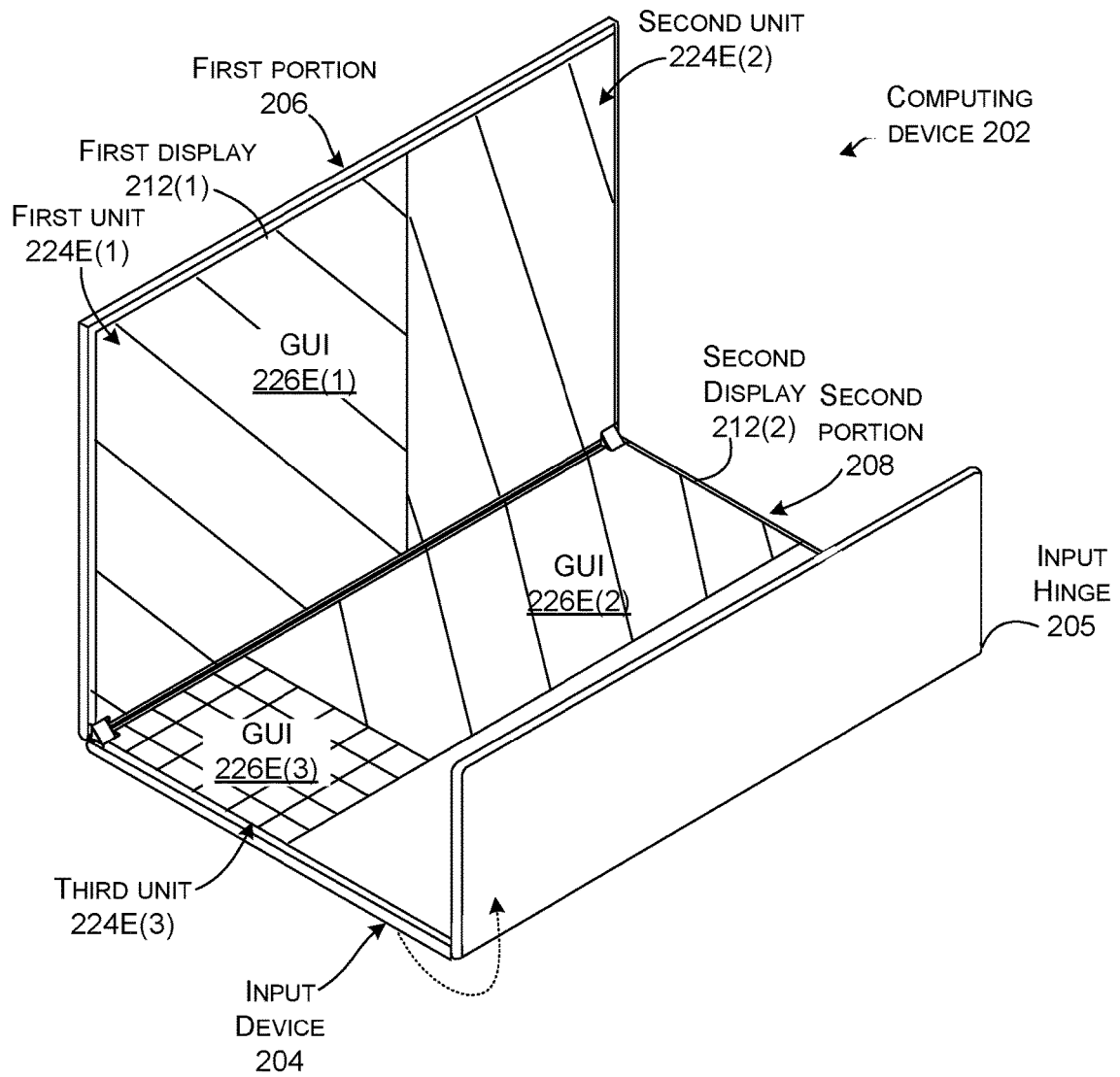

FIG. 2E shows the input device 204 rotated to the 270-degree orientation. The first unit 224E(1) as visualized by transition GUI 226E(1) is further narrowed and second unit 224E(2) continues to fill the occupied area as represented by transition GUI 226E(2). Further, a third unit 224E(3) is introduced on the upper left portion of second display 212(2) as evidenced by transition GUI 226E(3). Thus, FIGS. 2D and 2E show the user the changes to the displays to compensate for the presence of the input device 204 on the second portion 208 before such occurrence actually happens. Thus, the user can see what is changing and how it is changing.

Figure 2F:
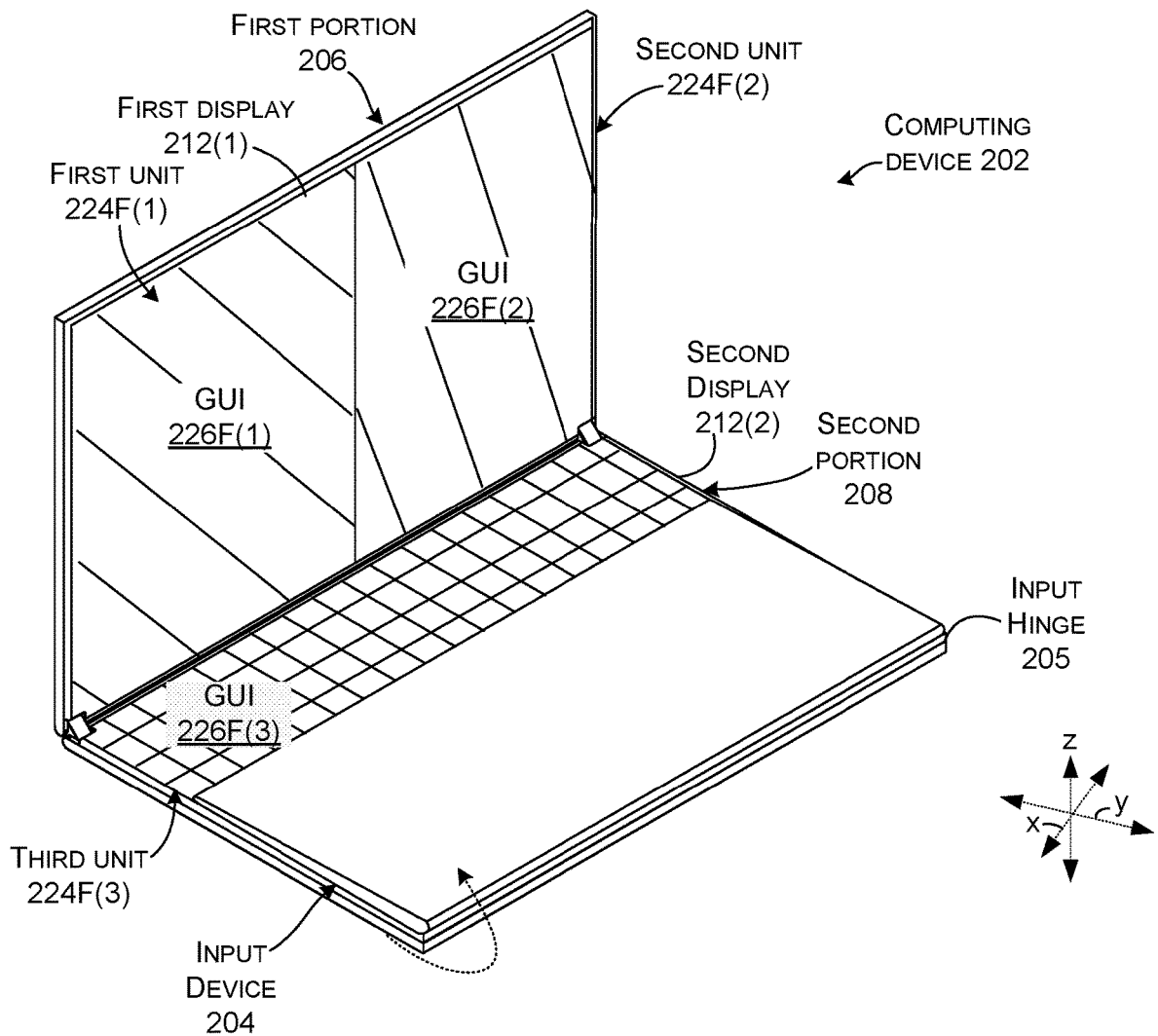

FIG. 2F shows the input device 204 rotated 360 degrees from the orientation of FIG. 2A and now contacting the second display 212(2). Units 224F(1) and 224F(2) as visualized by GUIs 226F(1) and 226F(2) are arranged side-by-side on the first display 212(1). A third unit 224F(3) visualized by GUI 226F(3) covers areas of the second display that are not blocked by the input device. The shape of the third unit may lend itself to specific functions. For instance, the long narrow shape may facilitate a toolbar functionality for either or both of GUIs 226F(1) and 226F(2) better than associating the third unit with another application. The transition GUIs of FIGS. 2D and 2E allow the user to be immediately ready to use the computing device as configured in FIG. 2F rather than the user having to pause to figure out how the computing device was reconfigured. Thus, the user can immediately start reading the content of GUIs 226F(1) and/or 226F(2) and/or using the input device 204.

FIGS. 3A-3D collectively show another scenario where system 300 can create visual indications for the user as the configuration of the computing device changes.

Figure 3A:
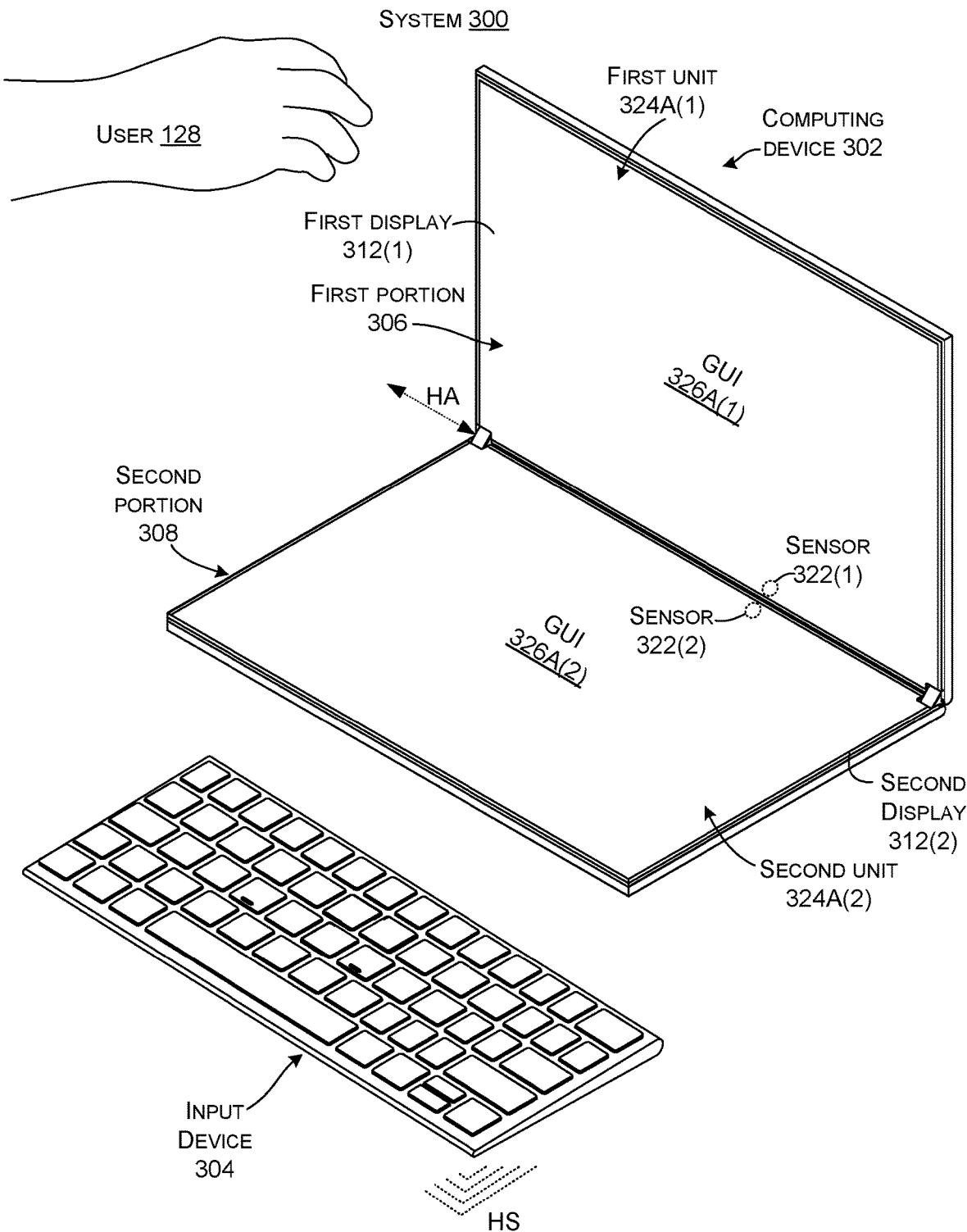

FIG. 3A shows computing device 302 in a 'notebook' orientation with the second portion 308 positioned on a horizontal surface (HS) and the first portion 306 oriented about 90-100 degrees from the second portion. In this case, input device 304 is positioned in front of, but separated from, the second portion on the horizontal surface. The computing device can employ sensors 322. In this case, the sensors can detect the orientation of the first and second portions in absolute terms and/or relative to one another. For instance, the sensors could be manifest as microelectromechanical systems (MEMS) sensors, such as inertial measurement units and/or inertial navigation systems, among others.

In this case, the first display 312(1) is being managed as a single unit 324A(1) with a single GUI 326A(1). Similarly, second display 312(2) is being managed as a single unit 324A(2) with a single GUI 326A(2). Note that in this case, text of the GUIs 326A is arranged horizontally. In this configuration, the horizontal orientation of the text runs parallel to a length of the displays 312 (e.g., parallel to the hinge axis (HA)).

Figure 3B:
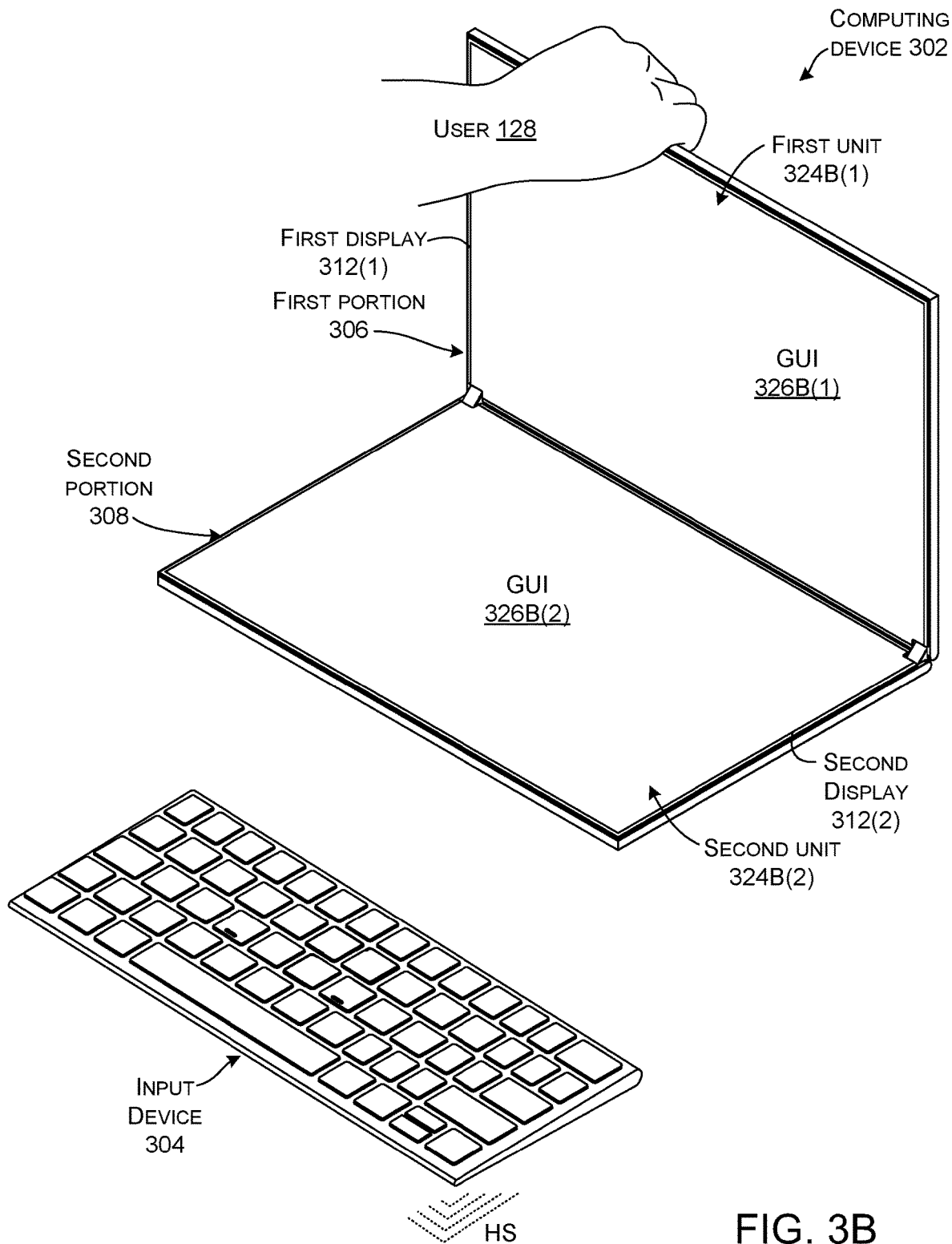

FIG. 3B shows user 128 grasping the first portion 306 to change the configuration of the computing device 302.

Figure 3C:
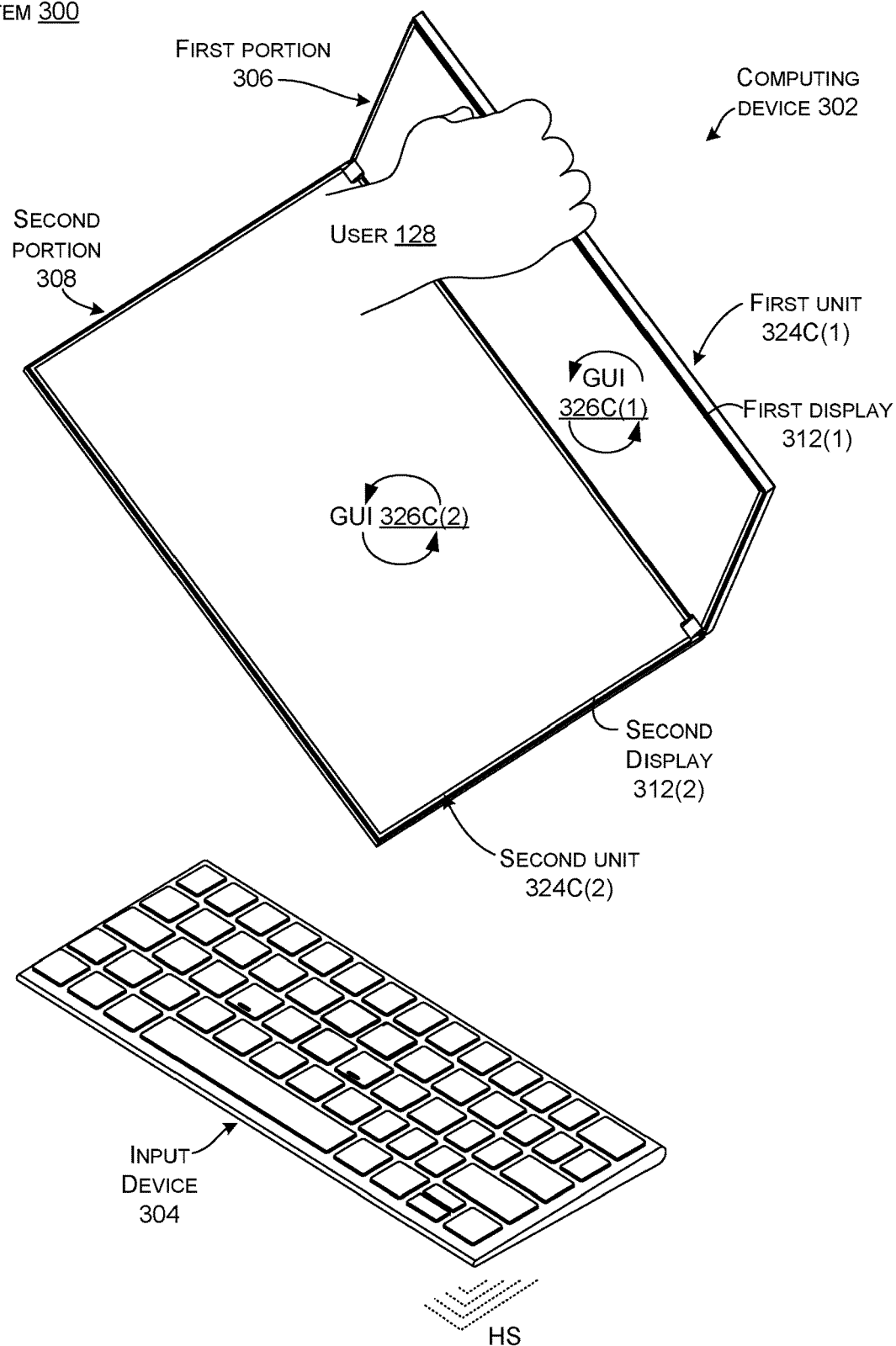

FIG. 3C shows the user turning the computing device 302 clockwise. The sensors 322 can detect this rotation. The computing device can make a prediction from the rotation and control the units 324 accordingly. Further, the computing device can provide indications to the user how the units will be controlled based upon the prediction. For instance, the prediction may be that the user will continue to rotate the computing device into an 'open book' configuration where the hinge axis is vertical (e.g., analogous to an open book where the spine is vertical and the text is horizontal on pages that are side by side). In this case, transition GUIs 326C(1) and 326C(2) show the text remaining horizontal despite the rotation of the computing device as an indication of how the units 324C are being managed.

Figure 3D:
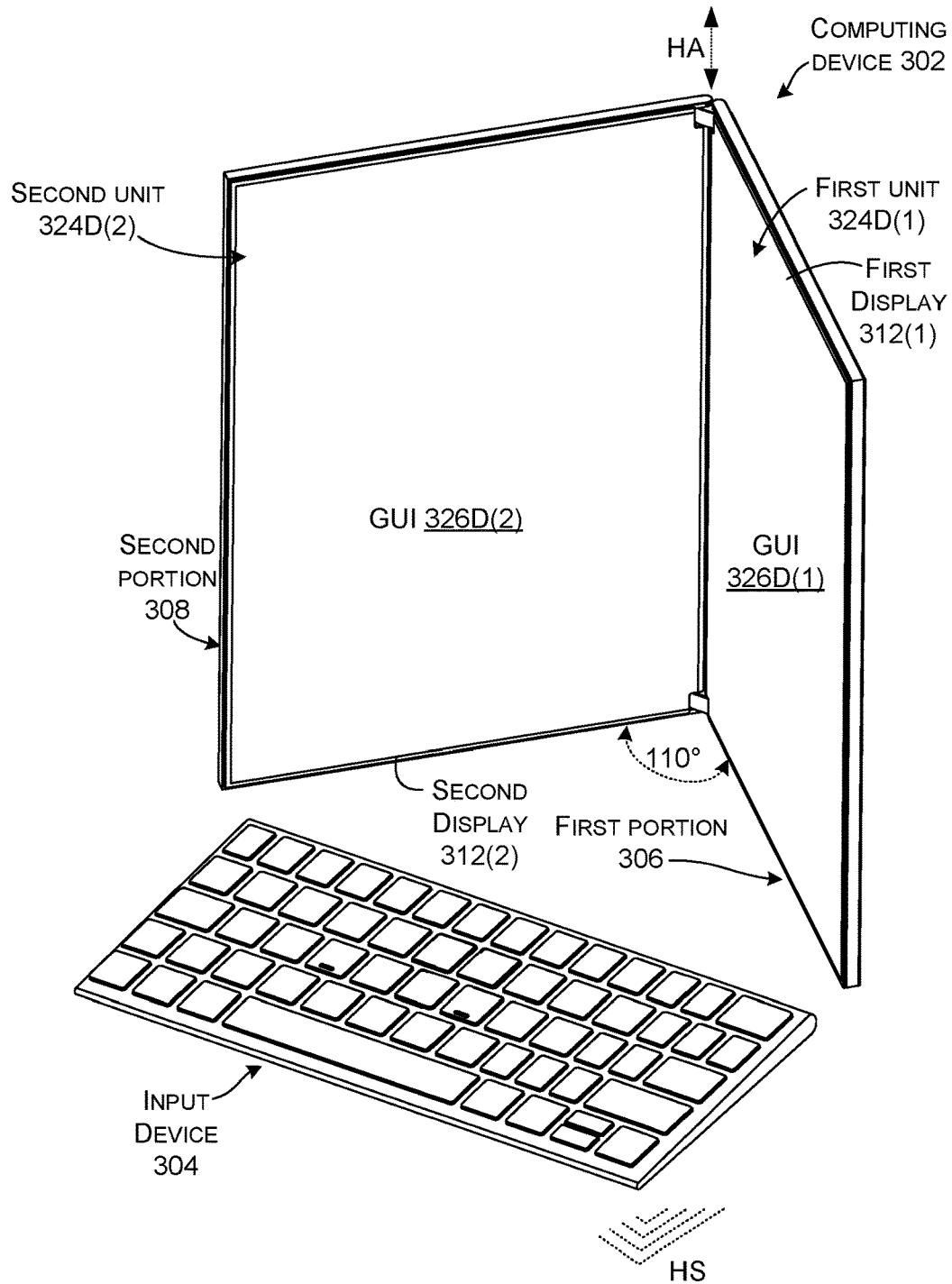

FIG. 3D shows the user's rotation of the computing device 302 completed with the hinge axis (HA) now vertical and the first and second portions 306 and 308 supporting the computing device on the horizontal surface. In this case, the user does not see any sudden flipping of the text on GUIs 326D, instead the transition GUIs provided indications to the user how the units 324D and the GUIs where being managed during the configuration change. Further, in this case, the prediction allowed the GUI orientation to be maintained throughout the rotation despite the rotation of the device, thereby further maintaining continuity and predictability for the user.

In some implementations, there may be a range of relative orientations between the first and second portions 306 and 308 that can stably support the computing device 302. For instance, the range might include angles between 80 degrees and 150 degrees, for instance. At other angles, the computing device may be prone to tipping over. Recall that in some implementations, the sensors 322 can detect the orientation of the first and second portions and the relative angle between the first and second portions and the orientations. For instance, the sensor data may indicate that the computing device is in a vertical open book orientation (such as in FIG. 3D) and the first and second portions are at an angle of 110 degrees relative to one another. When the computing device is in the vertical open book orientation, a sensory warning may be emitted if the orientation is outside of the stable range. For instance, if the user opens the angle to 170 degrees an audible warning may be emitted that the user should reduce the angle so that the computing device does not fall over.

FIGS. 3A-3D show how the computing device can be seamlessly transitioned from the displays positioned over and under (e.g., FIG. 3A) to side-by-side (e.g., FIG. 3D) as desired by the user. In either case, the input device can augment the functionality of the computing device so that all of the display area can be managed for content presentation as desired by the user.

Figure 4:
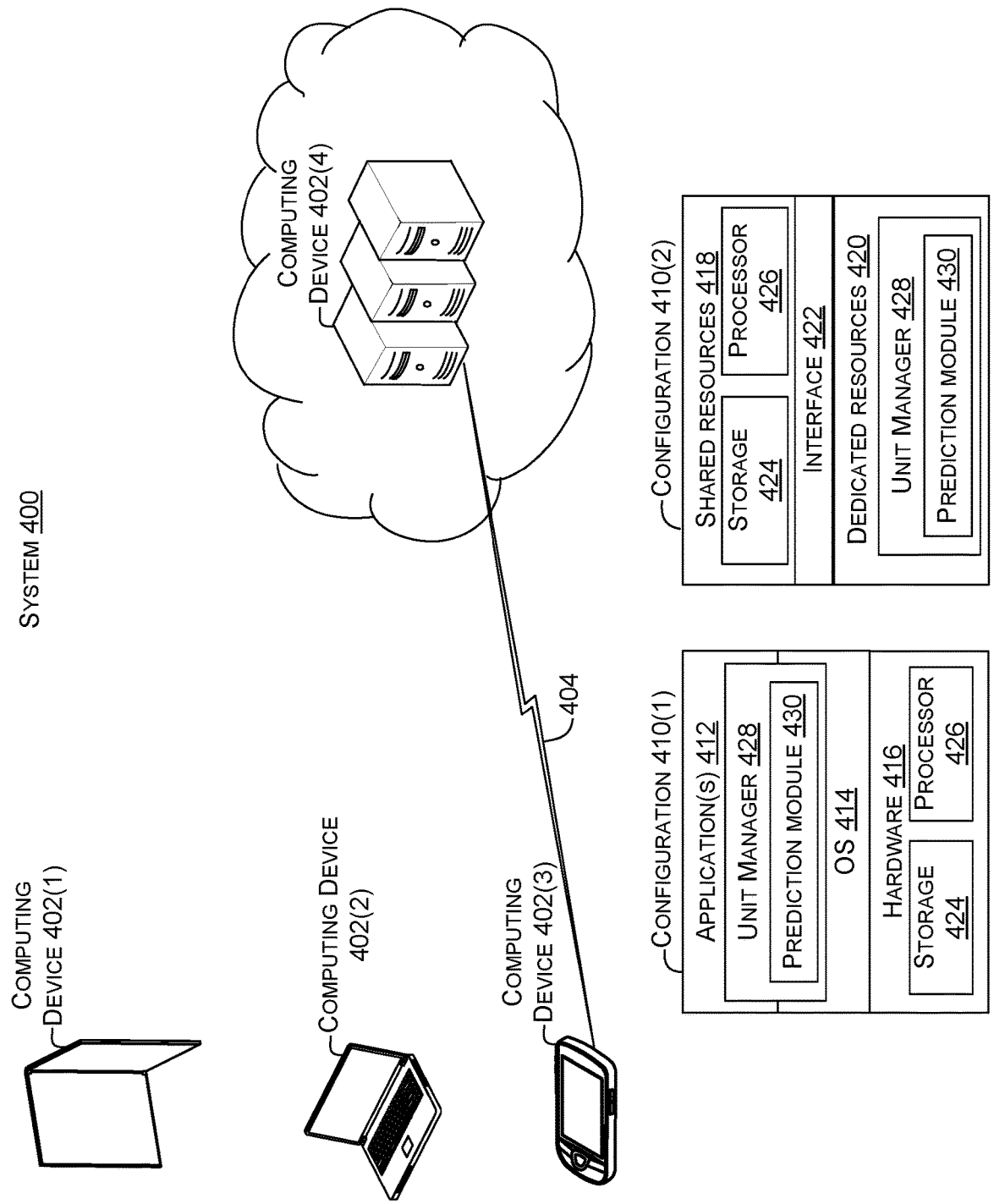
FIGS. 4 and 5 are example computing device display management block diagrams in accordance with some implementations of the present display management concepts.

FIG. 4 shows a system 400 that can accomplish display management concepts. For purposes of explanation, system 400 can include various computing device 402, such as computing device 402(1)-402(4). Computing device 402(1) is similar to computing device 102, 202, and/or 302 introduced above that has two displays. Computing device 402(2) is laptop computing device with a single display. Computing device 402(3) is a smart phone type device. Computing device 402(4) is a server type computer. Computing devices 402 can communicate via one or more networks (represented by lightning bolts 404). In some cases, parentheticals are utilized after a reference number to distinguish like elements. Use of the reference number without the associated parenthetical is generic to the element.

FIG. 4 shows two device configurations 410 that can be employed by devices 402. Individual devices 402 can employ either of configurations 410(1) or 410(2), or an alternate configuration. (Due to space constraints on the drawing page, one instance of each configuration is illustrated rather than illustrating the device configurations relative to each device 402). Briefly, device configuration 410(1) represents an operating system (OS) centric configuration. Configuration 410(2) represents a system on a chip (SOC) configuration. Configuration 410(1) is organized into one or more applications 412, operating system 414, and hardware 416. Configuration 410(2) is organized into shared resources 418, dedicated resources 420, and an interface 422 there between.

In either configuration 410, the device 402 can include storage/memory 424, a processor 426, and/or a unit manager 428. In some cases, the unit manager can include a configuration prediction module 430.

The unit manager 428 can generate and manage units on one or more displays of the computing device 402. The unit manager can decide how many units to employ on the displays, the dimensions of the units, and/or the function of the units. The unit manager can utilize various parameters as input to make these decisions. For instance, the unit manager can utilize various parameters about the configuration of the computing device. In some cases, the configuration prediction module 430 can analyze the parameters to predict a future configuration of the computing device. The unit manager 428 can compute how to manage the displays for the future configuration. The unit manager can generate transition GUIs to indicate to the user how the displays will be managed so the user is not surprised and/or confused by the changes.

In some configurations, each of computing devices 402 can have an instance of the unit manager 428. In other cases, a remote unit manager may determine how to manage the computing device's displays. For instance, computing device 402(4) could run a unit manager that receives sensed parameters from computing device 402(3), determines how to manage the display of computing device 402(3), and sends the display management information to computing device 402(3).

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs, etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and/or flash memory, among others.

Examples of computing devices 402 can include traditional computing devices, such as personal computers, desktop computers, servers, notebook computers, cell phones, smart phones, personal digital assistants, pad type computers, mobile computers, smart devices etc. and/or any of a myriad of ever-evolving or yet to be developed types of computing devices.

As mentioned above, configuration 410(2) can be thought of as a system on a chip (SOC) type design. In such a case, functionality provided by the computing device can be integrated on a single SOC or multiple coupled SOCs. One or more processors 426 can be configured to coordinate with shared resources 418, such as memory/storage 424, etc., and/or one or more dedicated resources 420, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, and/or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 5:
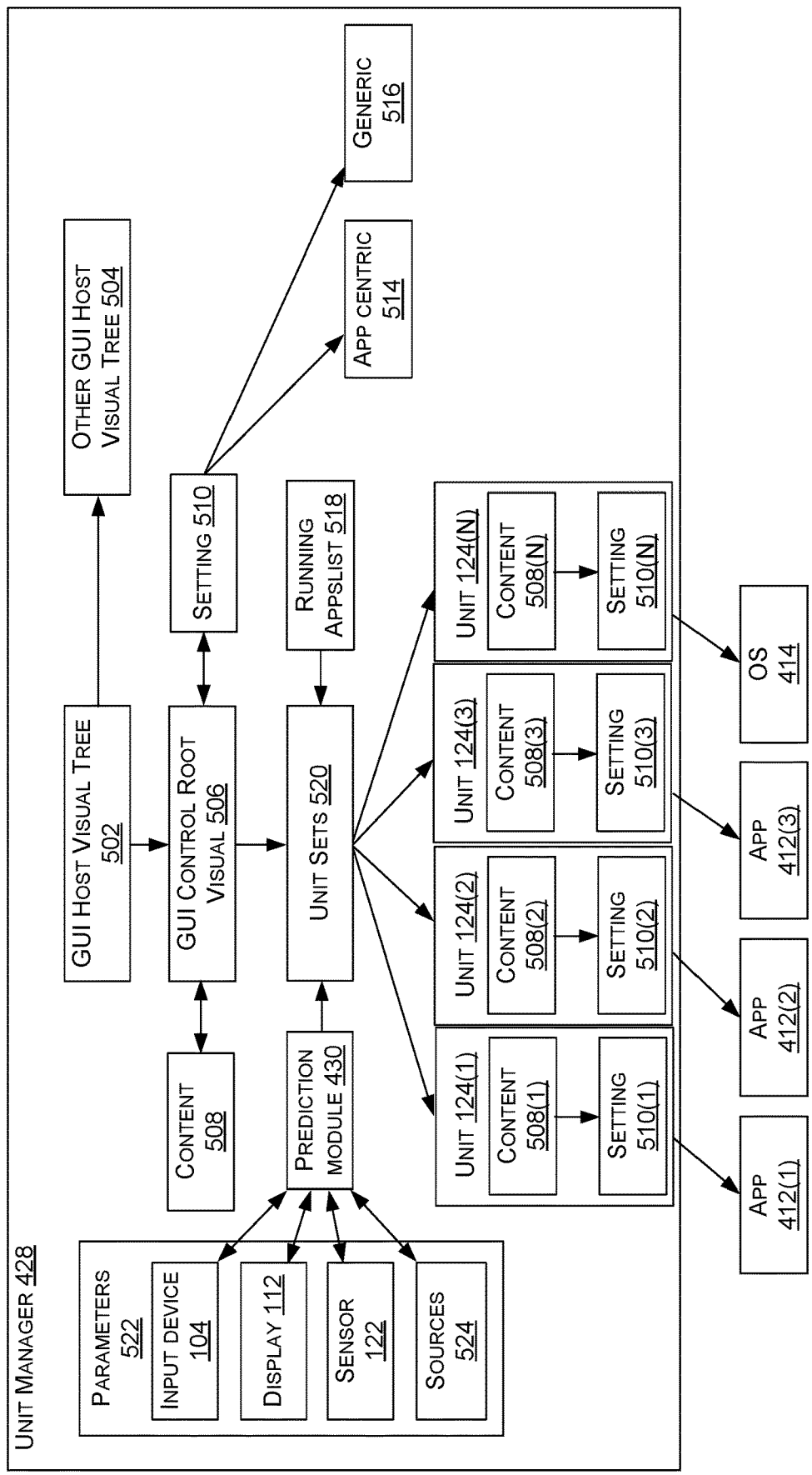

FIG. 5 is a block diagram of an example implementation of unit manager 428. The unit manager 428 can include a GUI host visual tree (also referred to as a GUI host) 502 that can include or reference other GUI host visual trees 504 for any number of GUI controls for different types of computing devices, such as 102, 202, 302 of FIGS. 1-3. In some implementations, the GUI host visual tree 502 can include a GUI control root visual 506 that can include Windows.UI.Composition and/or root Extensible Application Markup Language (XAML) code, for example. The GUI control root visual 506 can declaratively or imperatively generate various elements of a unit (e.g., units 124, 224, and/or 324 introduced above starting with FIG. 1A). For instance, when considering a unit, the GUI control root visual 506 can distinguish unit content 508 from unit setting 510. The unit setting, sometimes referred to as chrome, tends to be positioned around the content. The unit setting can be specific to an application (app centric 514), such as an application tool bar and/or generic 516, such as desktop background, and/or tool bars, taskbars, icons, etc. The unit manager 428 can also incorporate XAML code for generating visuals that are running outside of a process such as component applications and top-level applications.

The generic setting 516 can relate to the desktop background and can include any suitable image, any number of links or shortcuts to locally stored files, links to directories, and the like. Taskbars can include a link to a digital assistant, a task view illustrating open applications, a set of icons corresponding to applications being executed, and various icons corresponding to applications and hardware features that are enabled each time a device receives power.

In one example, the unit manager 428 can configure unit sets 520 based at least in part on input from the prediction module 430 and/or on a list of applications (412, FIG. 4)

being executed on the computing device (e.g., running appslist 518). The unit sets 520 can include one or more units (124, FIG. 1A, 224, FIG. 2A, 324, FIG. 3A) for the computing device at a specific instance in time. The list of applications 518 can indicate a number of applications for which units 124 may be managed with associated GUIs (FIG. 1A, 126, 226, FIG. 2A, 326, FIG. 3A).

The prediction module 430 can analyze various parameters 522 to determine the configuration of the computing device at that instant and to predict a future configuration. The parameters 522 can be obtained from and/or relate to input device 104, display 112, sensor 122, and/or other sources 524. For instance, the prediction module 430 can utilize sensor information to determine that the input device is moving toward the computing device and is likely to be positioned upon the device in a manner that blocks an area of one of the displays 112.

The unit manager 428 can utilize this prediction to define that area as a unit and to manage that unit consistent with the predicted blockage (e.g., don't plan to present an application on the blocked unit because the user won't be able to see it). The unit manager can utilize parameters, the number and/or type of applications that are running, the size, shape, and/or locations of the units, and/or the location and/or relative movement of the input device, among others, to compute how to manage the units.

For instance, the unit manager 428 may determine that the long and narrow shape of third unit 124E(3) in FIG. 1E may not lend itself to content presentation. However, such a long and narrow shape may lend itself for presentation of a tool bar. Thus, unit manager 428 may manage such a space as a generic tool bar (e.g., allows the user to interact with the operating system). Alternatively, the unit manager could manage the space as a toolbar associated with another unit, such as unit 124E(2). For example, all of unit 124E(2) could be managed for presenting content associated with an application and unit 124E(3) could be used to present the toolbar for the application. As such, the display area is better used than is possible in traditional scenarios. For example, unit 124E(2) may have an aspect ratio that is preferable for content presentation and more display area in unit 124E(2) can be dedicated to presenting content, because the toolbar is moved to unit 124E(3), which is less desirable for content presentation and would otherwise be 'wasted space' or 'under utilized space.'

The unit manager 428 can compute the unit sets 520 based at least in part on the parameters 522 described above. As mentioned, there may be a one-to-one relationship between units and applications, such as unit 124(1) and application 412(1). Alternatively, multiple units can be associated with an application, such as units 124(2) and 124(3) associated with application 412(2). In some examples one unit is on one display and the other unit is on another display, but they could be on the same display. Further, units can be associated with the operating system 414, such as unit 124(N) (where 'N' indicates that any number of units can be employed) associated with operating system 414, such as to display a tool bar, function as a touch pad, and/or display operating system content.

As mentioned above, the unit manager 428 can generate transition GUIs (see for example GUIs 126B and 126C of FIGS. 2B and 2C) that can help the user understand changes that are being made to the units. The transition GUIs may be full featured GUIs (e.g., include all of the details and/or features of the original GUI (see GUIs 126A of FIG. 1A) and the updated GUI (see GUIs 126F of FIG. 1F). Alternatively, the transition GUIs may be simplified GUIs. For instance, the transition GUIs may maintain the basic appearance of the original and updated GUIs without the details and/or functionality. For example, the transition GUIs may have a lower resolution than the original and/or updated GUIs. In another example, the user may not be able to interact with the transition GUI, such as typing content during the transition.

In some implementations, the unit manager 428 can manage the displays as a set of dynamically variable units. The unit manager can vary the size, aspect ratio, location, and/or function of individual units based upon present and/or predicted future conditions of the displays. The unit manager can utilize a set of private application programming interfaces (APIs) to manage the units. These private APIs can allow the unit manager to facilitate interactions between applications, the operating system and the units.

Figure 6:
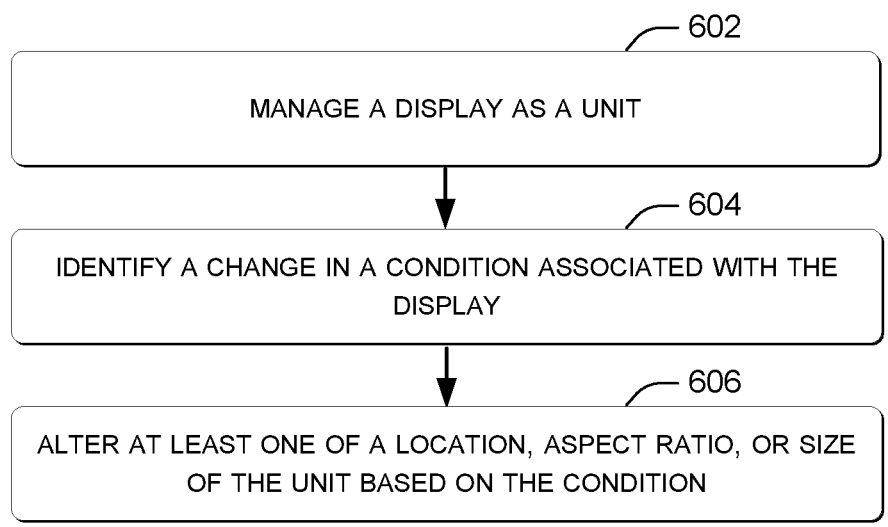
FIG. 6 is an example computing device display management flowchart in accordance with some implementations of the present concepts.

FIG. 6 illustrates a flowchart of a display control technique or method 600. At block 602, the method can manage a display as a unit. The method can manage a single display or multiple displays. Each display can be managed as one or more units.

At block 604, the method can identify a change in a condition associated with the display. In one case, the change in condition could be that an input device or other object is going to block an area of the display. In other cases, the change in condition can be a change in orientation of the device. For instance, the user may be rotating the device from a landscape orientation to a portrait orientation or vice versa, among others.

At block 606, the method can alter at least one of a location, aspect ratio, and/or size of the unit based on the condition. Some implementations can enhance the user experience by providing transitions that are intended to help the user understand the alterations that are being performed. For instance, transition GUIs can be presented on the units that visualize the changes in a manner that the user can understand rather than the display suddenly switching from one visual configuration to a completely different visual configuration.

The described methods can be performed by the systems and/or elements described above and/or below, and/or by other display management devices and/or systems.

The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on one or more computer-readable storage medium/ media as a set of instructions (e.g., computer-readable instructions or computer-executable instructions) such that execution by a processor of a computing device causes the computing device to perform the method.

The present computing device display management concepts can be utilized with any type of computing devices and/or associated input devices, such as but not limited to notebook computers, smart phones, wearable smart devices, tablets, and/or other types of existing, developing, and/or yet to be developed devices.

Various methods of manufacture, assembly, and/or use for these devices and associated input devices are contemplated beyond those shown above relative to FIGS. 1A-6.

Although techniques, methods, devices, systems, etc., pertaining to display management are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various device examples are described above. Additional examples are described below. One example includes a system comprising an input device and a computing device comprising a first portion associated with a first display and that is rotationally coupled to a second portion associated with a second display, a unit manager configured to present a first GUI on the first display and a second GUI on the second display, sensors configured to sense a position of the input device relative to the computing device, and the unit manager configured to utilize the sensed position to predict that the input device is going to physically occlude a portion of the second display and further configured to compute where to present an updated first GUI and an updated second GUI on the first and second displays to avoid the portion and to present transition first and second GUIs on the first and second displays before the portion is occluded.

Another example can include any of the above and/or below examples where the input device comprises additional sensors that interact with the sensors to provide information about a position and direction of movement of the input device relative to the second portion Another example can include any of the above and/or below examples where the input device comprises a keyboard, a touch pad, or a game controller.

Another example can include any of the above and/or below examples where the input device is as wide as the first and second displays or wherein the input device is narrower than the first and second displays.

Another example can include any of the above and/or below examples where the unit manager comprises a prediction module that utilizes sensor data to determine the sensed position and direction of movement of the input device.

Another example can include any of the above and/or below examples where the transition first and second GUIs have a shape and location that lies between a shape and location the first and second GUIs and a shape and location of the updated first and second GUIs.

Another example can include any of the above and/or below examples where the transition first and second GUIs have a lower resolution than the updated first and second GUIs.

Another example can include any of the above and/or below examples where the transition first and second GUIs comprise a video.

Another example can include any of the above and/or below examples where the input device is detachable.

Another example includes a computing device comprising a display, a unit manager configured to manage a unit of display area at a location on the display, sensors configured to sense a position of an input device relative to the computing device, and the unit manager configured to utilize the sensed position to predict that the input device is going to physically occlude a portion of the display and further configured to compute where to position the unit at another location on the display that does not include the portion.

Another example can include any of the above and/or below examples where the unit is a rectangle having first dimensions at the location and second dimensions at the another location.

Another example can include any of the above and/or below examples where the first dimensions and the second dimensions are the same.

Another example can include any of the above and/or below examples where the unit manager is further configured to generate a transition GUI that is located between the location and the another location.

Another example can include any of the above and/or below examples where the transition GUI has dimensions that are between the first dimensions and the second dimensions.

Another example can include any of the above and/or below examples where the transition GUI comprises a series of transition GUIs.

Another example can include any of the above and/or below examples where the transition GUI comprises a transition GUI video.

Another example includes a device comprising a display and storage. The device also comprises a processor configured to execute computer readable instructions stored on the storage, comprising managing the display as a unit, identifying a change in a condition associated with the display, and altering at least one of a location, aspect ratio, or size of the unit based on the condition.

Another example can include any of the above and/or below examples where the processor performs the altering before the change in the condition occurs.

Another example can include any of the above and/or below examples where the display comprises multiple displays and wherein the altering comprises moving the unit from a first of the multiple displays to a second of the multiple displays.

Another example can include any of the above and/or below examples where the unit comprises a first unit on the first display and a second unit on the second display and wherein the altering comprises resizing the first unit on the first display and moving the second unit from the second display to the first display.

Another example can include any of the above and/or below examples where the altering comprises generating transition GUIs that illustrate changes to the location, aspect ratio, or size of the unit.

Another example can include any of the above and/or below examples where the identifying comprises predicting the change prior to the change occurring.

Another example can include any of the above and/or below examples where the change relates to a change in visible display area.

The invention claimed is:

1. A system, comprising:
a hardware input device; and,
a computing device comprising:
   a first portion associated with a first display and that is rotationally coupled to a second portion associated with a second display;
   sensors configured to sense a current position of the hardware input device relative to the computing device; and,
   a display unit manager configured to present a first original GUI having a first original dimension and a first original location on the first display and a second original GUI having a second original dimension and a second original location on the second display, utilize the current position of the hardware input device to predict a future position of the hardware input device that is different from the current position and will physically occlude a portion of the second display, compute where to present a first updated GUI having a first updated dimension and a first updated location on the first display and a second updated GUI having a second updated dimension and a second updated location on the second display to avoid the portion when the hardware input device reaches the future position from the current position, and present a first transition GUI having a first transition dimension and a first transition location on the first display and a second transition GUI having a second transition dimension and a second transition location on the second display, the first transition dimension being between the first original dimension and the first updated dimension, the first transition location being between the first original location and the first updated location, the second transition dimension being between the second original dimension and the second updated dimension, the second transition location being between the second original location and the second updated location, at least one pair among the first original dimension and the first updated dimension, the first original location and the first updated location, the second original dimension and the second updated dimension, or the second original location and the second updated location is different from each other.

2. The system of claim 1, wherein the hardware input device comprises additional sensors that interact with the sensors to provide information about the current position and a direction of movement of the hardware input device relative to the second portion.

3. The system of claim 1, wherein the hardware input device comprises a keyboard, a touch pad, or a game controller.

4. The system of claim 1, wherein the hardware input device is as wide as the first and second displays or wherein the hardware input device is narrower than the first and second displays.

5. The system of claim 1, wherein the display unit manager comprises a prediction module that utilizes sensor data to determine the current position and a direction of movement of the hardware input device.

6. The system of claim 1, wherein the transition first and second GUIs have a lower resolution than the updated first and second GUIs.

7. The system of claim 1, wherein the transition first and second GUIs comprise a video.

8. The system of claim 1, wherein the hardware input device is detachable.

9. A computing device comprising:
a first display and a second display;
a display unit manager configured to present a first original unit of display area having a first original dimension at a first original location on the first display and a second original unit of display area having a second original dimension at a second original location on the second display;
sensors configured to sense a current position of a hardware input device relative to the computing device; and,
the display unit manager configured to utilize the current position to predict a future position of the hardware input device that will physically occlude a portion of the second display, compute where to present a first updated unit of display area having a first updated dimension at a first updated location on the first display and a second updated unit of display area having a second updated dimension at a second updated location on the second display that does not include the portion, and present a first transition unit of display area having a first transition dimension at a first transition location on the first display and a second transition unit of display area having a second transition dimension at a second transition location on the second display, the future position being different from the current position, the first transition location being between the first original location and the first updated location, the second transition location being between the second original location and the second updated location;

the first transition dimension being between the first original dimension and the first updated dimension, the second transition dimension being between the second original dimension and the second updated dimension; and at least one of the first updated location being different from the first original location, the first updated dimension being different from the first original dimension, the second updated location being different from the second original location, or the second updated dimension being different from the second original dimension.

10. The computing device of claim 9, wherein at least one pair of the first original dimension and the first updated dimension or the second original dimension and the second updated dimension is the same.

11. The computing device of claim 10, wherein at least one of the first transition unit or the second transition unit comprises a series of transition units.

12. The computing device of claim 10, wherein at least one of the first transition unit or the second transition unit comprises a transition video.

13. A device, comprising: a first display and a second display; storage device; and,
computer readable instructions stored on the storage device that, when executed, cause a processor to perform operations comprising:
managing a first original unit on the first display and a second original unit on the second display, identifying a change in a current occlusion condition of the second display,
predicting a future occlusion condition of the second display based at least on the change, the future occlusion condition being different from the current occlusion condition,
computing a first future unit and a second future unit based at least on the future occlusion condition, at least one of a first future size of the first future unit being different from a first original size of the first original unit, a first future location of the first future unit being different from a first original location of the first original unit on the first display, a second future size of the second future unit being different from a second original size of the second original unit, or a second future location of the second future unit being different from a second original location of the second original unit on the second display, and presenting a first transition unit on the first display and a second transition unit on the second display,
the first transition unit having a first transition location between the first original location and the first future location and having a first transition size between the first original size and the first future size, the second transition unit having a second transition location between the second original location and the second future location and having a second transition size between the second original size and the second future size.

14. The device of claim 13, wherein the processor computes the first future unit and the second future unit before the future occlusion condition occurs.

15. The device of claim 13, wherein computing the second future unit comprises moving the second original unit from the second display to the first display.

16. The device of claim 15, wherein computing the first future unit comprises resizing the first original unit on the first display.

17. The device of claim 13, wherein the future occlusion condition includes a portion of the second display occluded by a hardware input device.

18. The computing device of claim 11, wherein the series of transition units have a series of transition locations progressing either from the first original location to the first updated location or from the second original location to the second updated location.

19. The device of claim 13, wherein the second transition unit comprises a series of transition units having a series of transition locations progressing from the second original location of the second original unit to the second future location of the second future unit.

20. The device of claim 13, wherein the change includes a rotation of a hardware input device, and the future occlusion condition is different from the current occlusion condition with respect to an orientation of the hardware input device in relation to the second display.

* * * * *